United States Patent [19]

Kosugi et al.

[11] 4,014,842
[45] Mar. 29, 1977

[54] VINYL CHLORIDE RESIN COMPOSITIONS

[75] Inventors: Takumi Kosugi; Shigeki Yasunaga, both of Kobe; Yutaka Tanaka, Akashi; Yoshihiko Hashimoto, Kobe, all of Japan

[73] Assignee: Kanegafuchi Kagaku Kogyo Kabushiki Kaisha, Osaka, Japan

[22] Filed: Aug. 22, 1975

[21] Appl. No.: 606,766

Related U.S. Application Data

[63] Continuation-in-part of Ser. No. 363,478, May 24, 1973, abandoned.

[52] U.S. Cl. .................. 260/29.6 RB; 260/876 R; 260/881; 260/885
[51] Int. Cl.² .................. C08L 27/06; C08L 51/00
[58] Field of Search .......... 260/29.6 RB, 899, 885, 260/876 R

[56] References Cited

UNITED STATES PATENTS

| | | | |
|---|---|---|---|
| 3,520,953 | 7/1970 | Sugimoto et al. | 260/29.6 RB |
| 3,651,175 | 3/1972 | Ide et al. | 260/29.6 RB |
| 3,689,598 | 9/1972 | Bierwirth et al. | 260/899 |
| 3,763,279 | 10/1973 | Kelley | 260/29.6 RB |
| 3,821,327 | 6/1974 | Yamamoto et al. | 260/29.6 RB |
| 3,922,320 | 11/1975 | Love | 260/899 |

*Primary Examiner*—Murray Tillman
*Assistant Examiner*—W. C. Danison, Jr.
*Attorney, Agent, or Firm*—Moonray Kojima

[57] ABSTRACT

A vinyl chloride resin composition consisting essentially of a vinyl chloride polymer or copolymer of 70% or more by weight vinyl chloride and 30% or less by weight of one or more monomers copolymerizable therewith and a graft copolymer prepared by graft copolymerizing one or more monomers selected from alkyl methacrylate, vinyl aromatic compound and unsaturated nitrile, in the presence of an aqueous dispersion of alkyl acrylate elastomer obtained by copolymerizing an allyl ester of vinyl or vinylidene unsaturated alpha-carboxylic acid and alkyl acrylate.

8 Claims, No Drawings

VINYL CHLORIDE RESIN COMPOSITIONS

BACKGROUND OF THE INVENTION

This is a continuation-in-part of Ser. No. 368,478, filed May 24, 1973, now abandoned.

This invention relates to vinyl chloride resin composition or blend having excellent weather resistance, impact resistance and mechanical properties.

Vinyl chloride polymers and copolymers having 70% or more by weight vinyl chloride and 30% or less by weight of one or more monomers copolymerizable therewith (hereinafter such polymers and copolymers will be referred to as "PVC") have been broadly used because of their favorable mechanical and chemical properties. The monomers copolymerizable with the vinyl chloride are well known and can be found in any reputable publication and need not be repeated herein. There is one drawback to PVC, namely, its low impact resistance. Various additives have been used to strengthen the impact resistance, such as elastomers of conjugated dienes copolymerized with alkyl methacrylate, vinyl aromatic compound, unsaturated nitrile, and combinations thereof. It was found that due to the many double bonds in the main chain, these additives caused rapid degradation in outdoor conditions and lowered the impact resistance. Also, chemically saturated polyalkyl acrylate has been used instead of the conjugated diene elastomer, but without improvement of the impact resistance. British Patent No. 927,821 used a graft copolymer of of alkyl methacrylate, vinyl aromatic compound and/or unsaturated nitrile and alkyl acrylate copolymer containing up to 1.5% of a crosslinking monomer of divinylbenzene, diallyl maleate, diallyl fumarate or diallyl phthalate. However, in these prior art blends, there was always present various deficiencies, such as low impact strength, insufficient weathering properties, etc.

SUMMARY OF THE INVENTION

The present inventors have discovered a novel and outstanding additive or modifier for PVC blends, namely, a graft copolymer prepared by copolymerizing alkyl methacrylate or alkyl methacrylate and vinyl aromatic compound, or alkyl methacrylate, vinyl aromatic compound and unsaturated nitrile or vinyl aromatic compound and unsaturated nitrile, in the presence of an aqueous dispersion of alkyl acrylate copolymer prepared by copolymerizing an alkyl acrylate in the presence of an allyl ester of vinyl or vinylidene unsaturated alpha-carboxylic acid, in a specified amount.

It was discovered that allyl ester of vinyl or vinylidene unsaturated alpha carboxylic acid produces an effective cross-linking structure and readily takes to a graft structure because of its compatibility with PVC. Thus, the alkyl acrylate elastomer when prepared with the allyl ester of this invention has the required cross-linking structure and graft structure compatible with the PVC.

Briefly, this invention encompasses a vinyl chloride resin blend or composition comprising (I) 3 to 70 parts by weight of a graft polymer and (II) 30 and 97 parts by weight of PVC, as hereinbefore defined. The graft polymer is prepared by graft copolymerizing a monomer mixture in the amount of 20 to 80 parts by weight, in the presence of (A) an aqueous dispersion of 20 to 80 parts by weight of a copolymer of alkyl acrylate having 2 to 8 carbon atoms in the alkyl group or a mixture of at least 80% by weight of alkyl acrylate and up to 20% by weight of one or more monomers copolymerizable therewith and allyl ester of vinyl or vinylidene unsaturated alpha-carboxylic acid in an amount of 0.1 to 8% by weight. The monomer mixture which is grafted unto the alkyl acrylate substrate may be any of (1) 20 to 100% by weight of alkyl methacrylate (alkyl group having 1 to 4 carbon atoms), 0 to 80% by weight of a vinyl aromatic compound and 0 to 20% by weight of one or more monomers copolymerizable therewith; (2) 40 to 80% by weight of vinyl aromatic compound, 10 to 50% by weight of an unsaturated nitrile and 0 to 20% by weight of one or more monomers copolymerizable therewith (including alkyl methacrylate); (3) 20 to 70% by weight alkyl methacrylate, 10 to 60% by weight vinyl aromatic compound, 20 to 50% by weight unsaturated nitrile and 0 to 20% by weight one or more monomers copolymerizable therewith; and (4) 10 to 100% by weight of alkyl methacrylate, 0 to 80% by weight vinyl aromatic compound and 0 to 35% by weight unsaturated nitrile.

Advantageously, the invention has, inter alia, high impact strength, excellent weather resistance and other mechanical properties.

DETAILED DESCRIPTION OF PREFERRED EMBODIMENTS

Preparation of Elastomer Substrate Dispersion

The alkyl acrylate used in the elastomer component herein is used in aqueous dispersion. The alkyl acrylate contains 2 to 8 carbon atoms in the alkyl group, and has straight or branched chain. Examples are ethyl acrylate, propyl acrylate, n-butyl acrylate, isobutyl acrylate, pentyl acrylate, hexyl acrylate, n-octyl acrylate, 2-ethyl-hexyl acrylate. These monomers may be used singly or in a mixture of two or more. Up to 20 weight percent of the alkyl acrylate may be replaced by one or more monomers copolymerizable therewith. Examples of such monomers are alkyl acrylate which do not have 2 to 8 carbon atoms in the alkyl group, acrylic acid, acrylic acid metal salt, acrylamide, N-(substituted-)acylamide, methacrylic acid ester, methacrylic acid, methacrylic acid metal salt, methacrylamide, N-(substituted)methacrylamide, aromatic vinyl and its derivatives, acrylonitrile, methacrylonitrile, vinyl ether, vinyl ester, vinyl halide, vinylidene halide and mixtures of two or more of the foregoing.

The kinds and amounts of the alkyl acrylate and/or comonomers used therewith should be selected to prepare a polymer or copolymer which preferably has a glass transition temperature of −10° C or less. It is preferred that the glass transition temperature not be raised by copolymerizing with alkyl acrylate.

It is an essential requirement of the invention to copolymerize alkyl acrylate with an allyl ester of vinyl or vinylidene unsaturated alpha-carboxylic acid. It has been discovered that the allyl ester of this invention can easilytake a graft structure on the base of the allyl group and has good cross-linking effect in the copolymerization. The present inventors have discovered that cross-linking efficiency increases by lowering the reactivity of the copolymerization with the alkyl acrylate. The allyl ester is preferably used in an amount of 0.1 to 8% by weight. It was found that such use produced only a small amount of unreacted monomers and good cross-linking efficiency. On the other hand, when a conventional cross-linking monomer or agent is used, the cross-linking efficiency becomes low when only a small quantity of cross-linking agent is used and degradation of the elastomer occurs when a large amount is used. Advantageously, the allyl ester of this invention can be used in a small amount, at the low end of the range of 0.1% by weight, and the cross-linking efficiency is still high. Moreover, use of large amounts of the allyl ester, toward the upper range of 8% by weight, improves the mechanical properties without degradation. Examples of allyl ester of vinyl or vinylidene unsaturated alpha-carboxylic acid are allyl acrylate, allyl methacrylate, monoallyl itaconate and diallyl itaconate. These monomers may be used singly or in a mixture of two or more.

An aqueous dispersion of the alkyl acrylate elastomer, which for convenience will hereinafter sometimes be called substrate polymer, can be prepared using a conventional emulsion polymerization process and using the allyl ester of this invention. Emulsifiers, such as anion surfactant, non-ion surfactant and cation surfactant, may be used. Also, surface active builders or inorganic salt may be added. Also, various other additives may be used, such as known initiators such as peroxide, azo compond, oxidation-reduction type initiators; polymerization regulators. The temperature may be within the ordinary temperature range for emulsion polymerization, and preferably below 80° C, If the temperature is too high, the molecular weight of the product tends to become lower with decrease of gel content. It is particularly preferable to effect preparation of the substrate polymer at a temperature lower than that of the graft polymerization, which graft polymerization will be described hereinafter in greater detail, because the effect of graft polymerization tends to elevate. The graft polymerization may be done at a constant temperature or under heating or cooling stepwise during the polymerization process. The mixture of alkyl acrylate and copolymerizable allyl ester may be supplied all at the beginning, or partially or totally during or as the polymerization advances. It is convenient to effect the polymerization under total or partial addition in a manner which would eliminate easily the polymerization heat.

By the foregoing emulsion polymerization, an alkyl acrylate elastomer is produced. The gel content of the alkyl acrylate elastomer is preferably at least 50%, and more preferably at least 70%. A gel structure is required of the alkyl acrylate elastomer in order to stably disperse suitably sized particles of the graft strengthening polymer into the PVC when blended therewith.

The physical properties of the PVC blend will depend in part on the particle size of the aqueous dispersion of the substrate polymer because, it is believed, the particle size of the strengthening agent dispersed in PVC is decided thereby. The alkyl acrylate elastomer is preferably of particle size of 0.05 microns to 0.2 microns. When particle size is below 0.07micron, good results can be obtained by growing the particles before or during the graft polymerization to a suitable particle size.

Preparation of Graft Copolymer

The graft polymer can be prepared by polymerizing an aqueous dispersion of 20 to 80 parts by weight of the substrate polymer with 80 to 20 parts by weight of a resin component which is compat with PVC. The resin component includes any of the following: (1) alkyl methacrylate polymer or copolymer of alkyl methacrylate and vinyl aromatic compound; (2) copolymer of vinyl aromatic compound and unsaturated nitrile; (3) tripolymer of alkyl methacrylate, vinyl aromatic compound and unsaturated nitrile. The monomers may be in the following amounts: (1) 20 to 100% by weight alkyl methacrylate 0 to 80% by weight vinyl aromatic compound and 0 to 20% by weight one or more monomers compolymerizable therewith; (2) 40 to 80% by weight vinyl aromatic compound, 10 to 50% by weight unsaturated nitrile, and 0 to 20% by weight one or more monomers copolymerizable therewith, including alkyl methacrylate; (3) 20 to 70% by weight alkyl methacrylate, 10 to 60% by weight vinyl aromatic compound, 20 to 50% by weight unsaturated nitrile and 0 to 20% by weight one more monomers copolymerizable therewith; and (4) 10 to 100% alkyl methacrylate, 0 to 80% vinyl aromatic compound and 0 to 35% unsaturated nitrile. and be graft polymerized in accordance with a process to be described hereinbelow in greater detail.

The alkyl methacrylate has 1 to 4 carbon atoms in the alkyl group and may be straight or branched chain. Examples are methyl methacrylate, ethyl methacrylate, propyl methacrylate, isopropyl methacrylate, isobutyl methacrylate, sec-butyl methacrylate, and tera butyl methacrylate. Examples of the vinyl aromatic compound are styrene, vinyltoluene, alpha-(substituted)-styrene(such as alpha-methyl styrene), benzene-(substituted) styrene such as vinylstyrene, chloro-styrene, bromo styrene and its derivatives, vinylcarbazole, and vinyl biphenyl. Examples of unsaturated nitriles are acrylonitrile and methacrylonitrile. The foregoing monomers and compounds may be used in each group singly or in a mixture of two or more.

Each of the above listed monomers and compounds used to form the graft copolymer, may be replaced in an amount up to 20% by weight by one or more monomers copolymerizable therewith as discussed above. Examples of such copolymerizable monomers are alkyl acrylate, acrylamide, N-(substituted)acrylamide, methacrylic acid, methacrylic acid ester containing an organic residue other than alkyl group of 1 to 5 carbon atoms, methacrylamide, N-(substituted) methacrylamide, alkyl vinyl ether, alkyl vinyl ester, vinyl halide, vinylidene halide and mixtures of the foregoing.

As above set forth, the resin component is in an amount of 80 to 20 parts by weight, and the elastomer component is in an amount of 20 to 80 parts by weight. The physical properties of the PVC graft copolymer blend depend upon the composition of the graft polymer. Use of less than 20 parts by weight of the elastomer does not improve the impact resistance of the PVC blend. Use of more than 80 parts by weight of the elastomer causes the PVC blend to show very poor processibility and low impact resistance.

When alkyl methacrylate is replaced by over 80% by weight by a vinyl compound in the copolymerization of alkyl methacrylate with vinyl aromatic compound, the compatibility with PVC is reduced unfavorably. Other copolymerizable monomers including an unsaturated nitrile can be used in amount below 20% by weight. In combining vinyl aromatic compound with unsaturated nitrile, the amount of vinyl aromatic compound must be at least 40% by weight and that of unsaturated nitrile must be below 50% by weight. If the amount of unsaturated nitrile is over this amount, the obtained PVC blend shows a marked decrease in thermostability and processibility. If the amount of unsaturated nitrile is below 10% by weight, compatibility with PVC is reduced and impact resistance is lowered. In this case, 0 to 20% by weight of one or more monomers copolymerizable therewith may be used, including alkyl methacrylate. When alkyl methacrylate vinyl aromatic compound and unsaturated nitrile are used, the amounts of each are more preferably 20 to 70% by weight, 10 to 60% by weight and 20 to 50% by weight respectively. When alkyl methacrylate and unsaturated nitrile are used in amounts above 20% by weight, the use of vinyl aromatic compound is essential.

The graft polymerization can be performed using ordinary emulsion polymerization process. It can be done subsequent to the preparation of an aqueous dispersion of the substrate polymer, or concurrently therewith in another reactor. The polymerization can be effected in the presence or absence of initiator, emulsifer, polymerization regulator, inorganic salt, cross-linking agent, or other additives having the same or other desired effects. The additive to be added may be the same or different from those used in the preparation of the substrate polymer (also herein called elastomer). Other conditions, such as temperature from polymerization, amounts of aqueous solvent, may be the same or different, or be suitably changed during the polymerization process. The graft polymerization conditions used herein are known and are not critical to the elements of the invention. They may be obtained in any good textbook.

The polymerization can be effected in two or multiple steps by changing the composition or concentration or amount of each monomer used with the scope of the amounts and types of monomers set forth above. The components of the graft polymer would depend upon the properties desired in the resulting PVC blend. Also, the monomers can be supplied all at once, or in whole or partial amounts continuously or intermittently during the graft polymerization. All the monomers can be used in mixture and the polymerization can be effected by suitably changing the monomer components and amounts used in the graft copolymer, but in a manner which would not adversely affect the properties of the resulting PVC blend and of course within the limits set forth in the claims.

The graft polymerization process involves the use of the aqueous dispersion of alkyl acrylate elastomer (also herein called substrate polymer for convenience) obtained in the foregoing step. Unto the elastomer is grafted the resin component set forth above, using the graft polymerization conditions and monomer mixtures above set forth.

The obtained aqueous dispersion of graft copolymer, is then salted out and coagulated, filtered, washed with water, dried under spraying and recovered to give the graft polymer which will then be blended with the PVC. In this case, it can be coagulated with aqueous dispersion PVC or the like. In coagulation, known antioxidants, thermostabilizers or work improving agent for PVC may be added.

Preparation of Vinyl Chloride Resin Composition 3 to 70 parts by weight of the graft copolymer obtained above is mixed with 97 to 30 parts by weight of vinyl chloride polymer or copolymer of 70% or more vinyl chloride and 30% or less one or more monomers copolymerizable therewith. The resultant mixture is molded and blended with a roll, Banbury mixer, extruder or injection molding machine. Improvement of impact resistance is small when less than 3 parts by weight of graft copolymer is used; and the effect of adding PVC is lost in case more than 70 parts by weight of graft copolymer is used. It is also preferable to adjust the amount of alkyl acrylate elastomer to 1 to 30 parts by weight of the composition.

The graft copolymer of this invention may be blended with other polymers blendable with PVC, such as ethylene-vinyl acetate copolymer, ethylene-acrylate copolymer, ethylene-methacrylate copolymer, ethylene unsaturated carboxylic acid copolymer, styrene-acrylonitrile copolymer, styrene-methacrylate copolymer, acrylonitrile-butadiene-styrene resin (ABS resin), methacrylate-butadiene-styrene resin (MBS resin), acrylonitrile-butadiene polymer, polyethylene chloride polymer, or polymers modified so as to be blendable with PVC from these polymers and/or PVC together with plasticizers.

For preparing the blend or composition of this invention, thermostabilizers, ultraviolet light absorbers, lubricants, fillers, antistatic agents, or processing aids and other suitable additives may be added as desired.

This invention will be illustrated by actual examples, which are not to be construed to be limiting of the invention.

EXAMPLE 1

A Preparation of Substrate Polymer Aqueous Dispersion.

A mixture of the material shown in TAble 1 was stirred at 50° C. The mixture became hot in about 1 hour, and then cooled to below 60° C. The polymerization was effected for 6 hours, whereby an emulsion of the polymer (polymerization rate: 97%) was obtained.

Table 1

| | |
|---|---|
| Butyl acrylate | 100 parts |
| Allyl methacrylate | 1 part |
| Sodium dodecylbenzenesulfonate | 0.8 part |
| Potassium persulfate | 0.05 part |
| Water | 200 parts |

All the above parts are in terms of weight. Hereinafter all parts and percentages mentioned will be in terms of weight.

This aqueous dispersion was an emulsion having a granule diameter of 0.12 microns calculated from a turbidity of 546 microns. The emulsion was salted out and coagulated with calcium chloride, washed with water and methanol and dried with a vacuum drier. The dried polymer was collected with a stainless steel net of 100 mesh dipped in toluene in a dark place for 48 hours, and the attached toluene was removed. The polymer was weighed and dried again with a vacuum drier. The swell degree and gle content were calculated according to the following formula:

$$\text{Swell degree} = \frac{\text{Weight after swelling} - \text{weight after drying}}{\text{Weight after redrying}}$$

$$\text{Gel Content} = \frac{\text{Weight after Redrying}}{\text{Amount of Sample Collected}} \times 100$$

Thus, the polymer showed a swell degree of 15.9 and a gel content of 89.3%.

B. Preparation of the Graft Copolymer.

To a mixture of the aqueous dispersion of substrate polymer obtained in (A) and the materials of Table 2, the materials of Table 3 were added dropwise in 4 hours at 60° C with stirring. The resultant mixture was kept for 1 hour to complete the polymerization. The conversion was about 95%.

Table 2

| | |
|---|---|
| Substrate polymer aqueous dispersion as a solid polymer part | 60 parts |
| Water, including the water from the aqueous dispersion | 200 parts |
| Sodium formaldehyde sulfoxylate (hereinafter called "SFS") | 0.4 part |
| Ethylenediamine tetraacetate disodium (hereinafter called "EDTA 2Na") | 0.01 part |
| Ferrous sulfate heptahydrate | 0.005 part |

Table 3

| | |
|---|---|
| Styrene | 24 parts |
| Methyl methacrylate | 12 parts |
| Acrylonitrile | 4 parts |
| Cumene hydroperoxide (hereinafter called "CHP") | 0.2 part |

The obtained dispersion of the graft copolymer was salted out, and coagulated with calcium chloride solution. The copolymer was heated, granulated, dessicated, washed and dried to give a powdery resin.

C. Preparation of Vinyl Chloride Resin Composition or blend.

The graft copolymer (12 parts) was admixed with vinyl chloride polymer (average polymerization degree of 700; 100 parts), tin dibutyl mercaptide (2 parts), epoxided soya bean oil (1 part), and oily wax (0.5 part), then blended with a hot roll at 160° C for 5 minutes, compressed with a hot press at 180° C for 15 minutes to mold a sample. Impact strength and tensile strength were measured at 23° C in a conventional manner to give the result of Example I-1 in Table 4. The same procedure was effected except that allyl acrylate (1 part) was used in lieu of allyl methacrylate, to produce the result of Example I-2 in Table 4.

REFERENTIAL EXAMPLE I

An aqueous dispersion of the substrate polymer was prepared as above except that ethylene glycol dimethacrylate (1 Part) was used instead of allyl methacrylate in Example I, and the results are shown in Table 4 as Reference Example I-1. Reference Example I-2 uses divinylbenzene (1 part) instead of allyl methacrylate. Table 4 shows the physical properties of the substrate polymer and the vinyl chloride resin composition.

As shown in Table 4, addition of allyl ester of vinyl or vinylidene unsaturated alpha-carboxylic acid produced substantially better physical properties of the vinyl chloride resin blend than use of ordinary polyfunctional vinyl compounds.

Table 4

| Example No. | I-1 | I-2 | Ref Ex. I-1 | Ref Ex I-2 |
|---|---|---|---|---|
| Physical Properties of Substrate Polymer | | | | |
| Cross-linking agent | Allyl methacrylate | Allyl acrylate | Ethylene Glycol dimethacrylate | Divinylbenzene |
| Polymerization rate (%) | 98 | 96 | 97 | 95 |
| Particle diameter (micron) | 0.13 | 0.13 | 0.13 | 0.09 |
| Gel content (%) | 89.3 | 77.9 | 8.3 | 1.8 |
| Swelling Degree | 15.9 | 24.4 | 54.3 | 82.0 |
| Graft Copolymer conversion | 95% | 96% | 95% | 94% |
| Vinyl Chloride Resin Composition | | | | |
| Izod Impact strength (kg.cm/cm²) | 20.8 | 20.2 | 7.8 | 6.5 |
| Tensile strength (kg/cm²) | 482 | 472 | 399 | 388 |
| Elongation (%) | 185 | 180 | 184 | 180 |

Note:
(a) Izod impact strength: a value (kg.cm/cm²) measured with ¼inch notch at 23° C according to ASTM D256-56.
(b) Tensile strength: a value (kg/cm²) measured at 23° C according to ASTM D256-56.
(c) Elongation: a percent value to rupture measured at 230° C according to ASTM D256-56.
The foregoing measurement units apply hereinafter.

EXAMPLE II

A mixture of butyl acrylate (99.5 to 95 parts), allyl methacrylate (0.5 to 5 parts) and CHP (0.2 part), was added at 30° C with stirring in 6 hours to a mixture of the materials shown in Table 5, to effect polymerization and preparation of an aqueous dispersion of substrate polymer. After finishing the addition, the resultant mixture was kept for 2 hours to complete the polymerization. The substrate polymer obtained thereby exhibited the physical properties shown in Table 6.

Table 5.

| | |
|---|---|
| Water | 200 parts |
| Sodium oleate | 3 parts |
| Sodium napthalene sulfonate condensed with formaldehyde | 0.2 parts |
| SFS | 0.4 part |
| EDTA,2Na | 0.01 part |
| Ferrous sulfate heptahydrate | 0.005 part |

Into an aqueous dispersion of the substrate polymer obtained above, the materials shown in Table 2 were supplied. The amount of water was adjusted to make 250 parts including the amount of water required for adding the acetic acid and potassium hydroxide hereafter described. The reaction mixture was kept at 60° C, and 2% acetic acid solution (19 parts) was added. The mixture was kept for 15 minutes. Then, the dispersion was stibilized with 2% potassium hydroxide solution (18 parts). The materials shown in Table 3 were then used to obtain a graft copolymer, and then a vinyl chloride resin composition was prepared. The physical properties of the blend are shown in Table 6.

REFERENTIAL EXAMPLE II

For preparing an aqueous dispersion of the substrate polymer, the procedure in Example II was repeated without allyl methacrylate. The polymerization rate of the substrate polymer was 97% and the conversion rate of the graft polymer was 96%. The dispersion of graft polymer was salted out and coagulated in a conventional manner. Only block and no powder was obtained. The block was dried and combined with the vinyl chloride polymer as in Example I(C). It was difficult to effect roll manufacture, and mechanical properties could not be measured because of the very fragile properties. The results are shown in Table 6.

II. Still, it was not easy to work the vinyl chloride resin composition made therewith, and the mechanical properties could not be measured because of the fragile properties.

REFERENTIAL EXAMPLE IV

Example II was repeated except that a multifunctional crosslinking agent, divinylbenzene (DVB) (1 part) was used instead of allyl methacrylate, and the results are shown in Table 6. The physical properties thereof were the same as in Reference Examples II and III.

EXAMPLE III

Table 6

| Example no. | Substrate Polymer Butyl acrylate (parts) | Allyl acrylate (parts) | Polymerization rate(%) | particle diameter (micron) | Gel content (%) | Swell degree |
|---|---|---|---|---|---|---|
| II-1 | 99.5 | 0.5 | 96 | 0.06 | 93 | 23 |
| II-2 | 99 | 1 | 95 | 0.06 | 92 | 24 |
| II-3 | 98 | 2 | 95 | 0.06 | 90 | 21 |
| II-4 | 97 | 3 | 94 | 0.06 | 93 | 18 |
| II-5 | 95 | 5 | 95 | 0.06 | 92 | 21 |
| Ref.Ex. II | 100 | 0 | 97 | 0.06 | almost soluble | — |
| III-1 | 99 | EGDMA 1 | 96 | 0.06 | " | — |
| III-2 | 95 | EGDMA 2 | 96 | 0.06 | " | — |
| IV | 99 | DVB 1 | 94 | 0.06 | " | — |

| Example No. | Vinyl Chloride Resin Composition Conversion rate of graft polymerization (%) | Impact Resistance (kg.cm/cm$^2$) | Tensile strength (kg/cm$^2$) | Elongation (%) |
|---|---|---|---|---|
| II-1 | 96 | 11.5 | 476 | 187 |
| II-2 | 95 | 24.5 | 488 | 178 |
| II-3 | 95 | 27.8 | 486 | 179 |
| II-4 | 95 | 27.4 | 489 | 180 |
| II-5 | 95 | 17.8 | 485 | 188 |
| Ref.Ex. II | 96 | too fragile to measure | | |
| III-1 | 96 | " | | |
| III-2 | 96 | " | | |
| IV | 95 | " | | |

REFERENTIAL EXAMPLE III

Example II was repeated except that ethylene glycol dimethacrylate (EGDMA) was used, varying 1 part to 2 parts, in lieu of allyl methacrylate in Example II. The two runs were labeled Ref. Ex. III-1 and III-2. In this case, no powdery polymer was obtained from the dispersion of the graft polymer as in Reference Example II.

Polymerization was carried out as in Example II by using the monomers (40 parts) shown in Table 7, in the presence of the substrate polymer (60 parts) obtained using butyl acrylate (99 parts) and allyl methacrylate (1 part) as in Example II. The physical properties of the vinyl chloride resin composition obtained by blending the graft copolymer obtained by use of the monomers of Table 7 vinyl chloride polymer as in Example I(C), are shown in Table 7.

Table 7

| Ex.No. | Monomer mixture used in graft polymerization (%) Methyl methacrylate | Styrene | Acrylonitirle | Butyl acrylate |
|---|---|---|---|---|
| III-1 | 100 | | | |
| III-2 | 90 | 10 | | |
| III-3 | 75 | 25 | | |
| III-4 | 50 | 50 | | |
| III-5 | 50 | 35 | 15 | |
| III-6 | 50 | 15 | 35 | |
| III-7 | 40 | 40 | 20 | |
| III-8 | 30 | 40 | 30 | |
| III-9 | 30 | 70 | | |
| III-10 | 25 | 65 | 10 | |
| III-11 | 10 | 70 | 20 | |
| III-12 | | 80 | 20 | |
| III-13 | | 65 | 35 | |
| III-14 | 90 | | | 10 |
| III-15 | 60 | 30 | | 10 |
| III-16 | | 60 | 30 | 10 |
| | Conversion rate | Vinyl Chloride | Resin Composition | |

Table 7-continued

| Example No. | Monomer mixture used in graft polymerization (%) of graft polymerization (%) | Impact strength* | Tensile strength* | Elongation (%) |
|---|---|---|---|---|
| III-1 | 97 | 18.5 | 470 | 170 |
| III-2 | 96 | 16.8 | 475 | 185 |
| III-3 | 95 | 14.9 | 468 | 188 |
| III-4 | 95 | 18.6 | 466 | 168 |
| III-5 | 95 | 21.5 | 460 | 160 |
| III-6 | 94 | 18.4 | 472 | 185 |
| III-7 | 96 | 25.3 | 455 | 170 |
| III-8 | 95 | 19.2 | 455 | 182 |
| III-9 | 95 | 20.0 | 458 | 173 |
| III-10 | 94 | 21.4 | 453 | 154 |
| III-11 | 94 | 24.3 | 448 | 150 |
| III-12 | 95 | 22.6 | 460 | 177 |
| III-13 | 95 | 19.9 | 440 | 168 |
| III-14 | 96 | 20.5 | 462 | 158 |
| III-15 | 95 | 15.8 | 465 | 172 |
| III-16 | 97 | 18.8 | 458 | 160 |

*for units see previous tables.

Table 8

| Sample No. | Initial Strength | | | Strength after weathering for 500 hours | | |
|---|---|---|---|---|---|---|
| | Impact strength | Tensile strength | Elongation | Impact strength | Tensile strength | Elongation |
| I-1 Ref.Ex. | 22.3 | 482 | 185 | 12.0 | 508 | 76 |
| I-2 | 6.5 | 388 | 180 | 5.2 | 395 | 23 |
| II-2 | 24.5 | 488 | 178 | 12.4 | 525 | 73 |
| II-4 | 27.4 | 489 | 180 | 16.4 | 510 | 98 |
| III-1 | 18.5 | 470 | 170 | 14.6 | 505 | 110 |
| III-4 | 18.6 | 466 | 163 | 10.2 | 497 | 75 |
| III-13 | 19.7 | 440 | 168 | 15.7 | 498 | 82 |
| III-14 | 20.5 | 462 | 158 | 15.1 | 512 | 67 |
| MBS | 32.7 | 461 | 149 | 2.0 | 506 | 14 |

Note: for units of measurement see previous tables.

Weathering tests were carried out using a weather-ometer for 500 hours on the samples selected from examples I to III. Before and after the weathering tests, impact strength and tensile strength and elongation were measured in a conventional manner. In this case, commercially available alkyl methacylate-butadiene-styrene copolymer (MBS resin) was adopted as a control. The results are shown in the above table 8. It was evident that the samples of this invention have high impact resistance and excellent weather resistance.

EXAMPLE IV

The graft monomer was added as in Example II in the presence of a substrate polymer prepared from butyl acrylate (99 parts) and allyl methacrylate (1 part), but the addition of the graft monomer was effected separately in two parts. Thus, the first composition mixed with CHP (0.1 part) was added in two hours and kept for 30 minutes, then the second composition mixed with CHP (0.1 part) was added thereto in 2 hours and kept for 1 hour to complete the polymerization. In other operations, Example II was repeated. Physical properties of the resulting vinyl chloride resin composition are shown in Table 9.

Table 9

| Example No. | IV-1 | IV-2 | IV-3 |
|---|---|---|---|
| First graft composition (part) | | | |
| MMA | 15 | 15 | 6 |
| ST | 5 | 5 | 10 |
| AN | | | 4 |
| Second graft composition (part) | | | |
| MMA | 6 | 8 | 15 |
| ST | 10 | 12 | 5 |
| AN | 4 | 5 | |
| conversion rate (%) | | | |

Table 9-continued

| Example No. | IV-1 | IV-2 | IV-3 |
|---|---|---|---|
| for graft polymerization | 94 | 96 | 94 |
| Vinyl Chloride resing composition | | | |
| Izod impact resistance | 18.5 | 19.7 | 17.8 |
| Tensile Strength | 492 | 495 | 488 |
| Elongation | 165 | 182 | 167 |

(for units of measurement see previous tables)

EXAMPLE V

Example II was repeated except that allyl methacrylate (1 part) butyl acrylate (50 parts) and ethyl acrylate (49 parts) were used in the preparation of a substrate polymer in Example II. This case was called Example V-1. Butyl acrylate (90 parts) and acrylonitrile (9 parts) were used and called Example V-2. In both cases, the polymerization rate of the substrate polymer was above 95%, and the particle diameter of an aqueous dispersion thereof was 0.06 microns. The conversion of graft polymer was above 95% in both cases. The physical properties of the vinyl chloride resin composition are shown in Table 10.

Table 10

| Example No. | V-1 | V-2 |
|---|---|---|
| Composition of the substrate polymer | Butyl acrylate (50 parts) Ethylacrylate (49 parts) | Butyl acrylate (50 parts) Acrylonitrile (9 parts) |
| Polymerization rate | 96% | 95% |
| Particle Diameter | 0.06 micron | 0.06 micron |
| Gel content | 92% | 94% |
| Swelling degree | 24 | 16 |
| Conversion of graft polymer | 95% | 96% |
| Vinyl chloride resin composition | | |

Table 10-continued

| Example No. | V-1 | V-2 |
| --- | --- | --- |
| Izod impact strength | 17.5 | 16.8 |
| Tensile Strength | 506 | 495 |
| Elongation | 153 | 147 |

(units of measurement as shown in previous tables)

The foregoing description is for illustrative purposes. Numerous variations and modifications of this invention would be apparent to the worker skilled in the art. All such variations and modifications are to be considered to be within the spirit and scope of this invention.

What is claimed is:

1. A vinyl chloride resin composition consisting essentially of a blend of 30 to 97 parts by weight of a vinyl chloride honro polymer or a copolymer derived from 70% or more vinyl chloride and 30% or less one or more monomers copolymerizable therewith and 3 to 70 parts by weight of a graft polymer prepared by graft polymerizing 80 to 20 parts by weight of a monomer mixture of 10 to 100% by weight alkyl methacrylate selected from the group consisting of methyl methacrylate, ethyl methacrylate, propyl methacrylate, isopropyl methacrylate, isobutyl methacrylate, sec-butyl methacrylate, tert-butyl methacrylate, and mixtures thereof; 0 to 80% by weight of a vinyl aromatic compound selected from the group consisting of styrene, vinyl toluene, alpha substituted styrene, benzene-(substituted) styrene and its derivatives, vinyl carbazole, vinylbiphenyl and mixtures thereof; and 0 to 35% by weight unsaturate nitrile selected from the group consisting of acrylonitrile and methacrylonitrile; onto a substrate polymer of alkyl acrylate selected from the group consisting of ethyl acrylate, propyl acrylate, n-butyl acrylate, isobutyl acrylate, pentyl acrylate, hexyl acrylate, n-octyl acrylate, 2-ethyl-hexyl acrylate and mixtures thereof and an allyl ester of vinyl or vinylidene unsaturated alpha-carboxylic acid selected from the group consisting of allyl acrylate, allyl methacrylate, monoallyl itaconate, diallyl itaconate and mixtures thereof, said substrate polymer being in an aqueous dispersion and said allyl ester being in an amount of 0.1 to 8% by weight of said substrate polymer and the particles size of said dispersion being between 0.05 to 0.2 microns and the gel content being at least 50%.

2. The composition of claim 1, wherein said graft polymer is from a mixture of monomers of methyl methacrylate, styrene and acrylonitrile, and said allyl ester is allyl methacrylate, and and said alkyl acrylate is butyl acrylate.

3. The composition of claim 1, wherein said gel content is at least 70%.

4. The composition of claim 1, wherein the glass transition temperature of said substrate polymer is −10° C or less.

5. The composition of claim 1, wherein the aqueous dispersion is prepared at a temperature of below 80° C.

6. The composition of claim 1, wherein said alkyl acrylate is ethyl acrylate.

7. The composition of claim 1, wherein said alkyl acrylate is butyl acrylate.

8. The composition of claim 1, wherein said allyl ester is allyl acrylate.

* * * * *